E. B. Stocking,
Billiard Cue,

N° 63,575.     Patented Apr. 2, 1867.

Witnesses.
B. N. Loomis.
C. D. Sweeny.

Inventor.
Edgar B. Stocking.

United States Patent Office.

EDGAR B. STOCKING, OF BINGHAMTON, NEW YORK.

Letters Patent No. 63,575, dated April 2, 1867.

BILLIARD-CUE TIP AND FASTENER.

*The Schedule referred to in these Letters Patent and making part of the same.*

TO ALL WHOM IT MAY CONCERN:

Be it known that I, EDGAR P. STOCKING, of Binghamton, in the county of Broome, in the State of New York, have invented a new and improved Tip and Tip-Fastener for Billiard Cues; and I do hereby declare that the following is a full and exact description thereof, reference being had to the accompanying drawings, (which are of full and natural size,) and to the letters and figures of reference marked thereon.

To show the nature of, and also to enable those who are skilled in the art to make and use, my invention, I will proceed to describe its construction and operation.

Figure 1:
Figure 2:
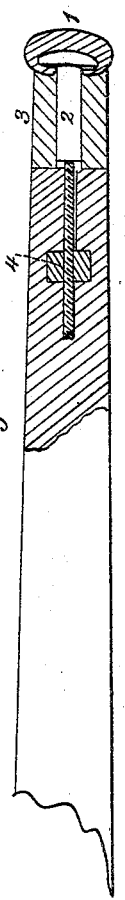
Figure 4:
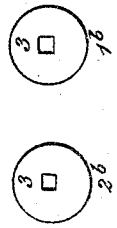
Figure 3:
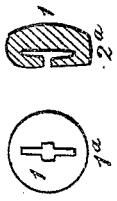

I construct the billiard cue in the usual form. I then make a circular opening in the smaller end thereof of about one-fifth of an inch in diameter and nine-tenths of an inch in depth, and insert therein a nut, shown in Figure 2, marked 4. I then insert in the same opening a wooden cylinder, in size equal to said opening, with a bore of about one-tenth of an inch in diameter, fastening the same by gluing the same upon its outer surface and inner end, thereby fixing permanently said nut. I then insert a screw, fitting said nut, having a square body, circular head, and oval face, in length about two and one-fifth inches, as shown in fig 2, marked 2, said screw passing through a movable ferrule, shown in fig. 2, marked 3, the front end of which is bevelled inwardly slightly, as shown in Figure 4, marked $2^b$, and the back end of which is perfectly level, as shown in fig. 4, marked $1^b$, with a square opening passing through its centre, easily fitting the square body of said screw. I then affix to said screw, at and upon its head, a tip, shown in fig. 2, marked 1, by means of a slit cut in its under surface, as shown in Figure 3, marked $1^a$, and another slit cut at right angles to this, as shown in fig. 3, marked $2^a$. Then, by turning said ferrule, it, acting as a wrench on the said screw, tightens the same, thereby fastening and holding the said tip in its proper place and for its proper purpose.

What I claim as my invention, is—

The combination of the slits in the under side of tips of rubber or leather and a screw, the head of which fits said slits, and the body of which is square, and fitting a ferrule, movable and having a square opening in its centre, and acting as a wrench, and a fixed nut in the billiard cue, as above described, and for the above-named purpose.

EDGAR B. STOCKING.

Witnesses:
B. N. LOOMIS,
C. D. SWEENY.